Figure 1:
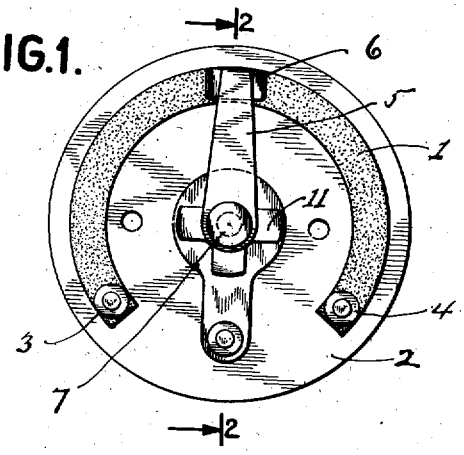

May 2, 1933.

S. RUBEN

RESISTANCE DEVICE

Filed Oct. 6, 1930
Original Filed Oct. 6, 1930

Re. 18,818

BY ATTORNEY

INVENTOR
SAMUEL RUBEN

Reissued May 2, 1933 Re. 18,818

UNITED STATES PATENT OFFICE

SAMUEL RUBEN, OF NEW ROCHELLE, NEW YORK, ASSIGNOR TO RUBEN PATENTS COMPANY, OF NEW ROCHELLE, NEW YORK, A CORPORATION OF DELAWARE

RESISTANCE DEVICE

Original No. 1,859,344, dated May 24, 1932, Serial No. 486,698, filed October 6, 1930. Application for reissue filed October 22, 1932. Serial No. 639,127.

This invention relates to a resistance device. It specifically relates to a variable resistance device which employs copper compounds as the resistance element. The object of the invention is the provision of a variable resistance device capable of permanent operation and having a wide range of resistance within predetermined limits.

For certain applications the invention constitutes an improvement upon the variable resistance device described in my co-pending application 306,608 filed in the United States Patent Office September 17, 1928, by means of which contact pressure changes vary the conductivity of a cuprous oxide resistance element.

In variable resistance elements of the prior art various materials are employed, such as a coating upon a ceramic base, composed of a thin layer of carbon, tellurium, graphite or germanium. To obtain wider ranges of resistance variation, other means are used, such as multiple coatings upon sections of the element.

Because of the inherent weakness of a thin coating of any of these materials, employing the usual binder materials, such for instance, as sodium silicate, the resistance layers are subject to atmospheric effects and are not permanent. Accurate control is difficult to obtain, as is uniformity of product.

I have found that copper oxidized at a temperature so high as to form a pure cuprous oxide mass, having its crystals thermally fused ito a clear ruby red material, produces a permanent high resistance body.

I have also found that if such cuprous oxide body is exposed to the vapors of ammonium polysulphide the oxide is converted into cuprous sulphide and its resistance decreases in proportion to the period of exposure and the density of the vapor. For example, a solid strip of cuprous oxide three inches by one inch by twenty-five mils, has a resistance of about 500,000 ohms. As a contact is moved along towards the more completely converted region, the resistance of the strip decreases with the length included in the circuit. After being suspended vertically over a quantity of ammonium polysulphide, it is partially converted into cuprous sulphide, the degree of conversion being dependent upon the proximity of the area of the surface of the sulphide and the time of exposure. By exposure of the cuprous oxide element to the heated vapors of selenium or tellurium, the oxide is converted into a selenide or telluride having low resistance. That is, after such treatment the resistance change is greatest at a section exposed where the vapor density was greatest and least at a point most remote from the surface of the sulphide. Thus, the oxide strip which had 500,000 ohms resistance over its three inch length, and in direct proportion to the distance between contacts, now has a high resistance at one end and a low resistance at the other, the latter dependent on the percentage of oxide converted to sulphide. The resistance of another strip so treated varied somewhat in the following order: 1st quarter (exposed longest to the sulphide vapors), 500 ohms; 2nd, 2,000 ohms; 3rd, 20,000 ohms; 4th, 50,000 ohms. The ratio varies with the time and temperature of the exposure and with the shape of the copper compound body. When applied to a circular piece, such as used in rotary type of resistance or potentiometer, different sectional resistance values are obtained by exposing portions of the oxide strip to the sulphide vapor for different lengths of time. Thus a rotary resistance has been made having a resistance range of 100 ohms to 100,000 ohms within 270° of a slider contact. The oxide and sulphide sections are hard and of smooth crystalline material and are capable of long use.

Figure 2:
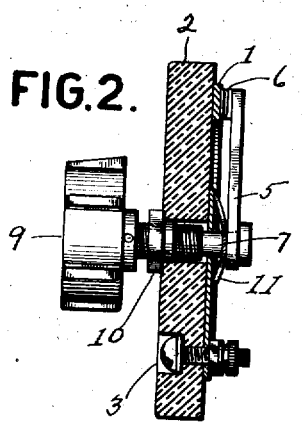

To more completely describe this invention, reference is made to the accompanying drawing of one embodiment thereof, in which Fig. 1 shows a plan view of one side of the device and Fig. 2 a sectional view at 2—2.

In the drawing 1 indicates a solid cuprous oxide circular strip mounted on porcelain base 2 and having terminals at 3 and 4. At 5 is an arm mounting contact brush spring 6, rotating on metal rod 7 and having a terminal at 8. Knob 9 is mounted on rod 7 for rotating the contact arm, the contact brush 6 being held in contact with resistance strip 1, by nut 10 against spring 11.

The resistance strip is made by heating a copper piece of the desired shape in an oxidizing atmosphere at approximately 1030° C. for two hours when the copper is wholly converted into a vitreous mass of cuprous oxide. This temperature is necessary to insure conversion of any cupric oxide that may be formed during the heating into cuprous oxide and to produce a fused-like structure. The surface of the element is then composed of black cupric oxide formed as the cuprous oxide strip is exposed to the air, and which must be removed by immersion in a strong mixture of hydrochloric and nitric acids. When thus cleaned, the strip constitutes a chemically pure cuprous oxide element of a bright ruby red color and which is translucent. Sections of the oxide strip are then exposed to vapors from ammonium polysulphide for different periods, according to the desired resistance range or control. The resultant resistance element consists of a base of cuprous oxide, coated with a layer of much higher conductivity, consisting of a mixture of copper oxide and copper sulphide, the proportion of copper sulphide in this lever varying along the length of the resistance. For a low resistance over the entire element it is exposed for a long enough period to the vapors of ammonium polysulphide. If only portions are desired to be of low resistance then only those portions are so exposed. Any resistance range can thus be obtained; that is, from several megohms to a fraction of an ohm, dependent upon the degree of conversion of the cuprous oxide to cuprous sulphide. The sulphide surface has a blue color.

I have found that for higher mechanical strength instead of pure copper, the base for forming the oxide is composed of copper having a small percentage of another element. Bases composed of such alloys as 99.5% copper and .5% nickel; 99.8% copper and .2% silver or 99.5% copper and .5% aluminum are stronger than those having a pure copper base. As the alloyed elements are oxidized the alloying metal also is oxidized and later sulphided. In these alloys the oxide is more dense and the crystals are smaller and are of higher specific resistance.

What I claim is:

1. A thermally formed resistance element for a variable resistance device having a conductive metal oxide for its lower sector and an upper sector integrally formed therewith, said upper sector being a thermally formed lower resistance compound of the mother metal of said lower sector oxide, the resistance of said element varying along its length in approximate proportion to the depth of said upper sector.

2. A variable resistance device comprising a base composed substantially of a metal oxide, a varying depth surface layer of which has been converted to a compound of the mother metal of said base having a lower resistance than said base, said surface layer approximately varying in resistance in proportion to its depth, and a contact member adapted to make selective electrical connection with said variable resistance surface along its length.

3. A variable resistance device comprising a base composed substantially of a metal oxide having an integral surface layer of lower resistance of a compound of the mother metal of said base, said layer varying in resistance along the length of said resistance element and a contact member adapted to make selective electrical connection with said variable resistance surface along its length.

4. A variable resistance device comprising a base composed substantially of an electrically conductive metal oxide and a layer of a lower resistance compound formed from and on the surface of said base and integral therewith, said layer being a compound of the mother metal of said base and an element of the oxygen series of the sixth periodic groups, said layer varying in specific resistance along the length of said resistance element, and a movable contact member mounted to pass over said variable resistance surface.

5. A variable resistance device comprising a base containing cuprous oxide having an integrally formed layer of a more conductive compound of copper on the contacting surface, said layer varying in specific resistance along the length of said resistance element, and a movable contact member mounted to pass over said variable resistance surface.

6. A variable resistance device comprising a base consisting substantially of copper oxide and an oxide of one or more metals other than copper, said base having an integrally formed layer of more conductive compounds of the same metals on the contacting surface varying in specific resistance along the length of said resistance element, and a movable contact member mounted to pass over said variable resistance surface.

7. In a rheostat a resistance element composed of a copper oxide base having a layer of a compound of copper and an element of the sulphur group, other than oxygen.

8. In a rheostat a resistance element comprising a base containing cuprous oxide and having an outer layer of a compound of copper and an element of the sulphur group, other than oxygen, of varying thickness.

9. In a rheostat a resistance element comprising a base containing cuprous oxide and having a copper sulphide layer thereupon varying in thickness inversely with the thickness of the base metal at any given section of the element.

10. In a rheostat a resistance element comprising a base composed of copper oxide and less than one percent. of an oxide of a metal having a higher specific resistance than copper, and having a layer of a compound of copper and an element of the sulphur series, other than oxygen.

11. In a rheostat a resistance element comprising a base containing cuprous oxide and less than one percent of an oxide of a metal having a higher specific resistance than copper and having a layer of copper sulphide.

12. In a rheostat a resistance element comprising a base containing cuprous oxide and less than one percent of an oxide of a metal having a higher specific resistance than copper, and having a layer of a compound of copper and an element of the sulphur series of the sixth periodic group, other than oxygen, said layer varying in thickness along the base inversely with the thickness of the base.

13. A rheostat having a resistance element comprising a base containing cuprous oxide and having a layer of a compound of copper and an element of the sulphur series of the sixth periodic group, other than oxygen.

14. A rheostat having a resistance element comprising a base containing cuprous oxide and having a layer of a compound of copper and an element of the sulphur series of the sixth periodic group, other than oxygen, said layer having a thickness varying inversely with the thickness of the base metal at any section of the base metal.

In testimony whereof, SAMUEL RUBEN has signed his name to this specification this 20th day of October, 1932.

SAMUEL RUBEN.